Figure 1:
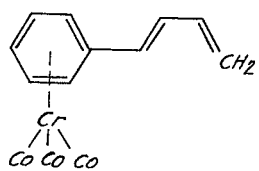
Figure 2:
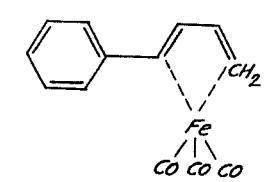
Figure 3:
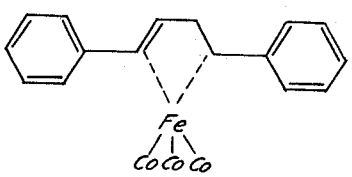
Figure 4:
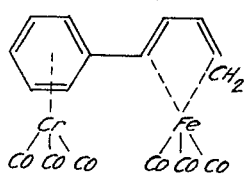
Figure 5:
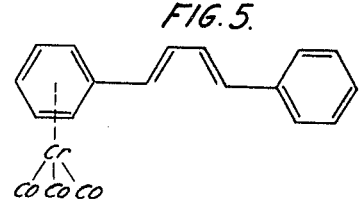

INVENTORS.
MICHAEL CAIS &
ASHER MANDELBAUM
BY Bierman + Bierman
ATTORNEYS

United States Patent Office 3,326,948
Patented June 20, 1967

3,326,948
ORGANOMETALLIC COMPOUNDS AND THEIR PREPARATION
Michael Cais and Asher Mandelbaum, Haifa, Israel, assignors of seventy-five percent to Technion Research and Development Foundation Limited, Haifa, Israel, a company of Israel
Filed May 17, 1962, Ser. No. 195,515
Claims priority, application Israel, May 22, 1961, 15,522
12 Claims. (Cl. 260—429)

This invention relates to organometallic compounds of the kind in which at least one transition-metal carbonyl group is bound by a $\pi$-bond to a hydrocarbon or substituted-hydrocarbon molecule having available $\pi$ electrons.

Known compounds of this kind include, for example, cyclopentadienyl compounds such as cyclopentadienyl manganese tricarbonyl. Moreover, dicyclopentadienyl iron compounds are known (usually referred to as "ferfocenes") in which an iron, cobalt, nickel or ruthenium atom is bound by $\pi$-bonds to two cyclopentadiene radicals.

Such organometallic compounds are suitable for many different technical applications. They may serve, for example, as additives to fuel or to lubricants, as drying agents to be incorporated in drying paints, varnishes, oils or resins, as intermediates in the manufacture of metal-containing polymers, and for producing, by thermal decomposition, metal coatings on metallic or non-metallic substrates. It is found that the more new kinds of such organometallic compounds are added to the list of those already known, the wider becomes the field of technical uses of these compounds, and the better are they suited to their different applications.

The invention consists in organometallic compounds comprising a hydrocarbon moiety composed of at least one cyclic component having available $\pi$-electrons and being connected to at least one olefinic chain component having at least two conjugated double bonds, and a transition-metal carbonyl moiety connected by a $\pi$-bond to either the cyclic nucleus or the side chain.

The cyclic component may be carbocyclic or heterocyclic. Examples of possible carbocyclic components in compounds according to the invention are benzene, cyclohexadiene, diphenyl, terphenyl, naphthalene, phenanthrene, cyclopentadiene. Heterocyclic components coming into regard are, for example, pyridine, pyrrol, pyrimidine, furan, thiophene. This enumeration of carbocyclic and heterocyclic components is not intended to be exhaustive.

The shortest possible olefinic chain component is butadiene. Longer chain components are possible, and these may have more than two conjugated double bonds, if so desired.

Both the cyclic and the olefinic chain components may carry substituents such as alkyl groups, halogen, hydroxyl groups and the like, and such substitution products are deemed for the purposes of this invention, to be included in the term "hydrocarbon moiety."

In its simplest form, which may be regarded as a prototype, the hydrocarbon moiety of an organometallic compound according to the invention comprises a cyclic component, e.g. a benzene nucleus, and a butadiene side chain, and the metal carbonyl moiety is connected by a $\pi$-bond to either the nucleus or the side chain. Such prototype can be developed in that a metal carbonyl group each is linked to the cyclic component and to the chain component. Yet further developments lead to hydrocarbon moieties in which two or more chain components are linked to the same cyclic component, or to hydrocarbon moieties in which the same chain component is linked to two cyclic components, and finally to hydrocarbon moieties comprising both several chain components and several cyclic components. Each double bond in both the cyclic component and the chain component of the hydrocarbon moiety is a potential linkage point for a metal carbonyl moiety.

Therefore, if it is desired for technical purposes to introduce as many metal atoms as possible into the molecule of the organometallic compound the hydrocarbon moiety will be so selected that it includes as many double bonds as possible. Cyclic double bonds are preferential linkage points, for example, for chromium, molybdenum and tungsten carbonyls, and the conjugated double bonds of the olefinic chain components are preferential linkage points, for example, for iron, ruthenium and osmium carbonyls. Cyclopentadiene nuclei have been found preferentially to become linked with, for example, manganese and rhenium carbonyls. This enumeration of metals is not limitative: in a general way the carbonyls of all transition metals are suitable for the purposes of this invention, especially those of Groups VI, VII and VIII of the Periodic Table and those of the group of lanthanide metals.

Owing to the preferential location of certain metal carbonyls at either the cyclic component or the chain component of the hydrocarbon moiety it is possible to link two or more different metal carbonyls to the same hydrocarbon moiety by a process that is carried out in two or more distinct steps. For example, if a "prototype" hydrocarbon moiety, e.g. 1-phenylbutadiene, is reacted first with chromium hexacarbonyl, chromium tricarbonyl is linked to the phenyl component only. Subsequently the 1 - (phenylchromium tricarbonyl) - butadiene thereby formed can be reacted with, for example, iron pentacarbonyl, whereby iron tricarbonyl is linked to the conjugated double bonds of the chain components and 1-(phenyl - chromium tricarbonyl) - butadiene - iron tricarbonyl is produced. Generally the metal carbonyl groups are linked to the hydrocarbon moiety by reaction of the hydrocarbon compound with a metal carbonyl in a water-free medium, e.g. with both reactants dissolved in a dry organic solvent. The organometallic compound can be separated from unreacted starting material by chromatography or by any other suitable separating method.

The organometallic compounds according to this invention can be used for many technical applications, especially those indicated above, it being understood that different compounds may have different potential uses. Those compounds according to the present invention which have unoccupied conjugated double bonds in the chain components, i.e. not occupied by a metal carbonyl, can be polymerized whereby valuable metal-containing polymers can be produced. Another potential use of at least some compounds according to the invention is as electric semi-conductors.

The invention is illustrated by the following examples to which it is not limited. The formulae referred to in the several examples are represented in the accompanying drawing by FIGS. 1 to 11. Indications of temperature are in degrees centigrade.

EXAMPLE 1

*1-(phenyl-chromium tricarbonyl)-butadiene*

A mixture of 2.6 g. of 1-phenylbutadiene and 4.4 g. of chromium hexacarbonyl in 70 ml. of butyl ether was refluxed for 9 hours, then allowed to cool and filtered. From the filtrate the solvent was evaporated and the residue was chromatographed over 100 g. of basic alumina. Elution with hexane yielded 0.49 g. of starting material. Further elution with hexane/benzene (4:1) yielded 0.87 g. of a yellowish oil whose infrared spectrum showed the typical $Cr(CO)_3$ moiety. This was 1-(phenyl-chromium tricarbonyl)-butadiene of FIG. 1.

EXAMPLE 2

1-phenylbutadiene-iron tricarbonyl

A mixture of 1.3 g. of 1-phenylbutadiene and 1.96 g. of iron pentacarbonyl in 50 ml. of butyl ether was refluxed for 24 hours. After removing the solvent in vacuo, the residue was chromatographed over 100 g. of alumina.

Elution with hexane yielded 2.5 g. of a yellowish solid M.P. 57–59°. Crystallization from methanol produced the analytical sample of M.P. 64–65°, being 1-phenylbutadiene-iron tricarbonyl of FIG. 2.

*Analysis.*—Calculated for $C_{13}H_{10}O_3Fe$: C, 57.81; H, 3.73; Fe, 20.68%. Found: C, 57.65; H, 3.83; Fe, 20.07%.

EXAMPLE 3

1,4-diphenylbutadiene-iron tricarbonyl

A mixture of 0.206 g. of 1,4-diphenylbutadiene and 0.196 g. of iron pentacarbonyl in 25 ml. of butyl ether was refluxed for 48 hours. After removal of the solvent, the residue was chromatographed over 70 g. of alumina. Elution with hexanol/benzene (9:1) yielded 0.19 g. of yellow solid which was purified by sublimation in vacuo (140°/0.01 mm.) to obtain crystals of M.P. 164° being 1,4-diphenylbutadiene-iron tricarbonyl of FIG. 3.

*Analysis.*—Calculated for $C_{19}H_{14}O_3Fe$: C, 65.92; H, 4.07%. Found: C, 65.82; H, 4.10%.

EXAMPLE 4

1-(phenyl-chromium tricarbonyl)-(butadiene-iron tricarbonyl)

A mixture of 5.2 g. of 1-phenylbutadiene and 8.8 g. of chromium hexacarbonyl in 150 ml. of butyl ether was refluxed for 10 hours. To this mixture were added 7.84 g. of iron penta-carbonyl and 50 ml. of butyl ether and the mixture was further refluxed for another 24 hours. The mixture was allowed to cool and filtered, then the solvent was removed in vacuo from the filtrate and the residue was chromatographed over 200 g. of alumina. Elution with hexane yielded 1.87 g. of a substance whose infrared spectrum was similar to that of 1-phenylbutadiene iron tricarbonyl.

Further elution with hexane/benzene (4:1) yielded 2.38 g. of crystalline material, the infrared spectrum of which showed the carbonyl absorptions of the —$Cr(CO)_3$ and $Fe(CO)_3$ moieties.

The analytical sample of this material was crystallized from hexane/benzene, orange crystals, M.P. 162–163°. This was 1-(phenyl-chromium tricarbonyl)-butadiene-iron tricarbonyl of FIG. 4.

*Analysis.*—Calculated for $C_{16}H_{10}O_6FeCr$: C, 47.32; H, 2.4%. Found: C, 47.49; H, 2.41%.

Further elution with benzene yielded another 1.2 g. of yellowish oil which solidified on standing and which showed in the infrared spectrum the same carbonyl absorptions as the previous fraction.

EXAMPLE 5

1-(phenyl-chromium tricarbonyl)-4-phenylbutadiene and 1,4-di(phenyl-chromium tricarbonyl)-butadiene A mixture of 8.8 g. of chromium hexacarbonyl, $Cr(CO)_6$, and 4.12 of 1,4-diphenylbutadiene in 150 ml. of butylether was refluxed for 9 hours in an inert atmosphere. After removing the solvent, the residue was dissolved in a mixture of hexane/benzene (1:1) and chromatographed over basic alumina.

Elution with benzene/hexane (1:1) yielded 1.43 g. of the starting material. Further elution with benzene yielded 2.5 g. of red crystals which after recrystallization from hexane/benzene had M.P. 150–152°. This was 1-(phenyl-chromium tricarbonyl)-4-phenylbutadiene of FIG. 5.

*Analysis.*—Calculated for $C_{19}H_{14}CrO_3$: C, 66.66; H, 4.12, Cr, 15.2%. Found: C, 66.69; H, 4.22; Cr, 16.0%.

Figure 6:
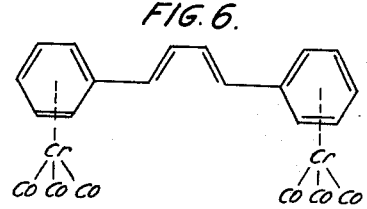
Figure 7:
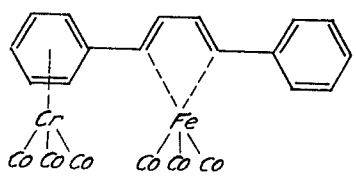
Figure 8:
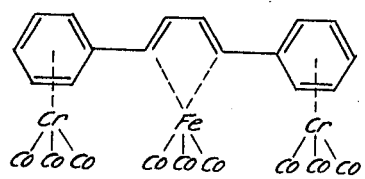
Figure 9:
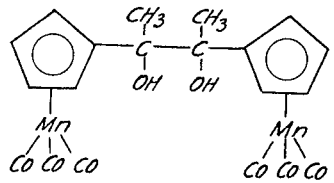
Figure 10:
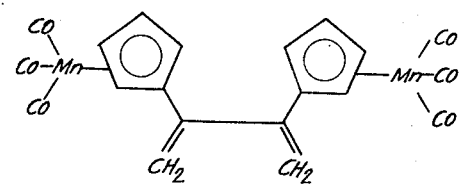
Figure 11:
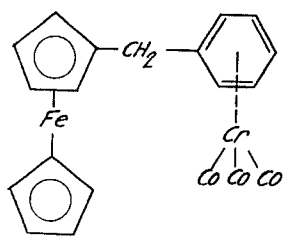

Further elution of the column with benzene yielded 0.093 g. of red crystals, M.P. 174–176°, being 1,4-di-(phenyl-chromium tricarbonyl)-butadiene of FIG. 6.

*Analysis.*—Calculated for $C_{22}H_{14}Cr_2O_6$: C, 55.24; H, 2.95; Cr, 21.75%. Found: C, 55.51; H, 2.85; Cr, 21.80%.

1,4-di-(phenyl-chromium tricarbonyl)-butadiene could also be obtained by refluxing the monochromium derivative with $Cr(CO)_6$ in butyl ether.

EXAMPLE 6

1-(phenyl-chromium tricarbonyl)-4-phenyl butadiene-iron tricarbonyl

A mixture of 0.342 g. of 1-(phenyl-chromium tricarbonyl)-4-phenylbutadiene and 0.208 g. of iron pentacarbonyl, $Fe(CO)_5$ in 30 ml. of butyl ether was refluxed for 23 hours in an inert atmosphere. The residue remaining after removal of the solvent was chromatographed over 150 g. of basic alumina. Elution with hexane/benzene (9:1) yielded a forerun of 0.117 g. of material. Further elution with hexane/benzene (1:1) yielded 0.120 g. of crystals, M.P. 186–188° (from methylcyclohexane) being 1-(phenyl-chromium tricarbonyl)-4-phenyl butadiene-iron tri-carbonyl of FIG. 7.

*Analysis.*—Calculated for $C_{22}H_{14}O_6FeCr$: C, 54.80; H, 2.92%. Found: C, 55.04; H, 2.98%.

The infrared spectrum showed the typical absorptions of iron and chromium carbonyl moieties at 1864, 1942 and 2042 cm.$^{-1}$.

EXAMPLE 7

1,4-di-(phenyl-chromium tricarbonyl)-butadiene-iron tricarbonyl

A mixture of 0.478 g. of 1,4-di-(phenyl-chromium tricarbonyl)-butadiene and 0.2 g. of iron pentacarbonyl in 70 ml. of butyl ether was refluxed for 22 hours in an inert atmosphere. The mixture was cooled and filtered. The residue consisted of 0.127 g. of yellowish-red crystals, M.P. 197°. The filtrate was evaporated to dryness and the residue chromatographed over basic alumina. Elution with benzene yielded 0.312 g. of the starting material. Further elution with chloroform yielded another 0.038 g. of yellowish-red crystals identical with the crystals obtained as the filter residue. These crystals were 1,4-di-(phenyl-chromium tricarbonyl)-butadiene-iron tricarbonyl of FIG. 8.

*Analysis.*—Calculated for $C_{20}H_{14}O_9FeCr_2$: C, 48.57; H, 2.28%. Found: C, 48.36; H, 2.27%.

EXAMPLE 8

2,3-di-(cyclopentadienyl-manganese tricarbonyl)-butadiene

A mixture of 12.3 g. of acetylcyclopentadienyl-manganese tricarbonyl, aluminum amalgam (prepared from 0.9 g. of aluminum and 0.45 g. of mercuric chloride), and 50 ml. of dry benzene was heated with stirring for 4 hours. After cooling there was added 10 ml. of benzene and 5 ml. of water and the mixture was heated for another 1.5 hour. The hot mixture was filtered, the residue washed several times with hot benzene, and the benzene filtrate and washings were concentrated to a small volume. Upon addition of petroleum ether, 4.35 of yellow crystals formed, which after recrystallization from benzene/methyl-cyclohexane, had M.P. 162.5–165°. This was the pinacol of FIG. 9.

*Analysis.*—Calculated for $C_{20}H_{14}O_8Mn_2$: C, 48.56; H, 3.26; Mn, 22.23%. Found: C, 48.82; H, 3.14; Mn, 22.24%.

The crude pinacol aforesaid was admixed with 8.4 g. of distilled phosphorus oxychloride and 70 ml. of dry pyridine and the mixture was refluxed for 6 hours. After removal of the solvents in vacuum, 150 ml. of water was added gradually with external cooling and the resulting solution was extracted with benzene. The benzene extract was washed with dilute hydrochloric acid, then with dilute sodium hydroxide solution, then with water, then the benzene was evaporated and the residue consisted of 7.25 g. of a yellowish oil.

A benzene solution of the oily residue was passed through a short column of basic alumina to yield 6.07 g. of a yellowish oil which crystallized on standing. This was recrystallized from ether at 0° and sublimed in vacuum (190–200°/0.1 mm. Hg) to yield crystals M.P. 116–117°, being 2,3-di(cyclopentadienyl-manganese tricarbonyl)-butadiene of FIG. 10.

*Analysis.*—Calculated for $C_{20}H_{12}O_6Mn_2$: C, 52.43; H, 2.64; Mn, 23.98%. Found: C, 52.69, H, 2.75; Mn, 24.22%.

EXAMPLE 9

*1-(benzyl-chromium tricarbonyl)-ferrocene*

A mixture of 0.179 g. of 1-benzyl ferrocene and 0.14 g. of chromium hexacarbonyl in 50 ml. of butyl ether was refluxed for 20 hours in an inert atmosphere. After removal of the solvent, the residue was dissolved in hexane and chromatographed over 4.0 g. of basic alumina. Elution with hexane and then hexane-benzene (9:1) yielded 0.08 g. of benzyl ferrocene and 0.1 g. of a second material. Further elution with benzene yielded 0.04 g. of crystals M.P. 164–165° (from petroleum ether) being 1-(benzyl-chromium tricarbonyl)-ferrocene of FIG. 11.

*Analysis.*—Calculated for $C_{20}H_{16}O_3FeCr$: C, 58.28; H, 3.91%. Found: C, 58.52; H, 3.84%.

Infrared spectrum showed the typical carbonyl bands at 1839 and 1965 cm.$^{-1}$.

Having now particularly described and ascertained the nature of our said invention and in what manner the same is to be performed, we declaire that what we claim is:

1. Organometallic compounds comprising (1) a hydrocarbon composed of at least one carbocyclic component having available pi electrons, said component being connected to at least one olefinic hydrocarbon radical having at least two conjugated double bonds, and (2) at least two transition metal atoms liganded to a radical taken from the class consisting of carbonyl and cyclopentadienyl, at least one of said atoms being connected by a pi bond to a said carbocyclic component and one of said metal atoms being connected by a pi bond to a said olefinic hydrocarbon radical and at least one of said metals being bonded to three carbonyl radicals, the olefinic radical being connected at one end only to a carbocyclic radical.

2. Organometallic compounds according to claim 1, wherein the hydrocarbon moiety comprises a single cyclic component and a single chain component, the chain component being connected at one end only to said cyclic component.

3. Organometallic compounds according to claim 1, wherein the metal moiety on the carbocyclic radical is formed by the carbonyl of a metal taken from the class consisting of chromium, molybdenum and tungsten.

4. Organometallic compounds according to claim 1, wherein the metal moiety on the olefinic radical is formed by the carbonyl of a metal taken from the class consisting of iron, ruthenium and osmium.

5. 1 - (phenyl-chromium tricarbonyl) - butadiene-iron tricarbonyl.

6. 1 - (phenyl - chromium tricarbonyl) - 4 - phenylbutadiene.

7. 1,4 - di - (phenyl - chromium tricarbonyl) - butadiene.

8. 1 - (phenyl - chromium tricarbonyl) - 4 - phenyl butadiene-iron tricarbonyl.

9. 1,4 - di - (phenyl - chromium tricarbonyl) - butadiene-iron tricarbonyl.

10. 2,3 - di - (cyclopentadienyl-manganese tricarbonyl)-butadiene.

11. 1 - (benzyl-chromium tricarbonyl) - ferrocene.

12. A process for the preparation of organometallic compounds comprising a hydrocarbon composed of at least one carbocyclic component having available pi electrons, said component being connected to at least one olefinic hydrocarbon radical having at least two conjugated double bonds, the olefinic component being attached at one end only to a carbocyclic component, wherein said metal-free hydrocarbon compound is reacted first with a metal carbonyl compound preferentially linking up with one of the components, and the organometallic compound thus produced is further reacted with a metal carbonyl compound preferentially linking up with the other component.

References Cited

UNITED STATES PATENTS

| | | | |
|---|---|---|---|
| 2,818,416 | 12/1957 | Brown et al. | 260—429 |
| 2,818,417 | 12/1957 | Brown et al. | 260—429 |
| 3,064,023 | 11/1962 | Wilkinson et al. | 260—429 |
| 3,077,489 | 2/1963 | Ihrman et al. | 260—439 |
| 3,111,533 | 11/1963 | Ecke | 260—439 |

FOREIGN PATENTS 626,563 8/1961 Canada.

OTHER REFERENCES

Calderazzo et al., La Ricerca Scientifica, 29, December 1959, pages 2615–7.

Nicholls et al., Proceedings of the Chemical Society, London, May 1958, page 152.

Schrauzer et al., J. Am. Chem. Soc., 81, Oct. 20, 1959, pages 5307–9.

TOBIAS E. LEVOW, *Primary Examiner.*

W. J. VANBALEN, A. P. DEMERS,
*Assistant Examiners.*